(12) United States Patent
Campbell et al.

(10) Patent No.: US 7,555,549 B1
(45) Date of Patent: Jun. 30, 2009

(54) CLUSTERED COMPUTING MODEL AND DISPLAY

(75) Inventors: Ralph B. Campbell, San Jose, CA (US); Bryan N. O'Sullivan, Burlingame, CA (US); Robert J. Walsh, Sunnyvale, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 783 days.

(21) Appl. No.: 10/983,810

(22) Filed: Nov. 7, 2004

(51) Int. Cl.
*G06F 15/173* (2006.01)

(52) U.S. Cl. ............... 709/224; 709/223; 717/127; 717/128; 717/130; 717/131

(58) Field of Classification Search .......... 709/223, 709/224; 717/127, 128, 130, 131
See application file for complete search history.

(56) References Cited

U.S. PATENT DOCUMENTS

| | | | | |
|---|---|---|---|---|
| 5,168,554 A * | 12/1992 | Luke | ............... | 715/209 |
| 5,881,237 A * | 3/1999 | Schwaller et al. | ............... | 709/224 |
| 6,057,839 A * | 5/2000 | Advani et al. | ............... | 715/784 |
| 6,061,722 A * | 5/2000 | Lipa et al. | ............... | 709/224 |
| 6,272,539 B1 * | 8/2001 | Cuomo et al. | ............... | 709/223 |
| 6,282,701 B1 * | 8/2001 | Wygodny et al. | ............... | 717/125 |
| 6,393,480 B1 * | 5/2002 | Qin et al. | ............... | 709/224 |
| 6,578,077 B1 * | 6/2003 | Rakoshitz et al. | ............... | 709/224 |
| 6,836,881 B2 * | 12/2004 | Beynon et al. | ............... | 717/128 |
| 7,039,015 B1 * | 5/2006 | Vallone et al. | ............... | 370/252 |
| 7,058,843 B2 * | 6/2006 | Wolf | ............... | 714/4 |
| 7,133,911 B1 * | 11/2006 | Schaffer et al. | ............... | 709/224 |
| 2003/0005112 A1 * | 1/2003 | Krautkremer | ............... | 709/224 |
| 2003/0093513 A1 * | 5/2003 | Hicks et al. | ............... | 709/224 |
| 2003/0097438 A1 * | 5/2003 | Bearden et al. | ............... | 709/224 |
| 2003/0229695 A1 * | 12/2003 | Mc Bride | ............... | 709/224 |
| 2004/0117768 A1 * | 6/2004 | Chang et al. | ............... | 717/125 |
| 2005/0132337 A1 * | 6/2005 | Wedel et al. | ............... | 717/128 |
| 2005/0204028 A1 * | 9/2005 | Bahl et al. | ............... | 709/223 |
| 2006/0047805 A1 * | 3/2006 | Byrd et al. | ............... | 709/224 |
| 2006/0048098 A1 * | 3/2006 | Gatlin et al. | ............... | 717/124 |
| 2006/0075302 A1 * | 4/2006 | Ulrich et al. | ............... | 714/38 |

OTHER PUBLICATIONS

"Intel® Trace Analyzer 4.0" (online), date unknown, Intel, [retrieved on Feb. 3, 2005]. Retrieved from the Internet: <URL: http://www.intel.com/software/products/cluster/tanalyzer/index.htm>.

"SCALEA: Performance Instrumentation, Measurement, Analysis and Visualization Tool for Parallel Programs—Introduction" (online), Nov. 17, 2003, retrieved on Feb. 3, 2005]. Retrieved from the Internet: <URL: http://dps.uibk.ac.at/projects/scalea>.

(Continued)

*Primary Examiner*—Salad Abdullahi
*Assistant Examiner*—Anthony Mejia
(74) *Attorney, Agent, or Firm*—Klein, O'Neill & Singh, LLP

(57) ABSTRACT

A preferred embodiment of the present invention provides a way of gathering performance data during execution of an application executing on clustered machines. This data is then presented to the user in a way that makes it east to determine what variables and situations to change in order to improve performance. A described embodiment displays the color of displayed vertical bands in accordance with how much a particular call is contributing to the effect of communication time, latency, and bandwidth.

19 Claims, 17 Drawing Sheets

Data Gathering

OTHER PUBLICATIONS

CEPBA Web Site for Paraver (online), date unknown, Center for Parallelism of Barcelona, [retrieved on Feb. 3, 2005]. Retrieved from the Internet: <URL: http://www.cepba.upc.es/paraver/index.htm>.

CEPBA Web Site for Dimemas (online), date unknown, Center for Parellelism of Barcelona, [retrieved on Feb. 3, 2005]. Retrieved from the Internet: <URL: http://www.cepba.upc.es/dimemas/index_1.htm>.

"Tau: Tuning and Analysis Utilities" (online), date unknown, Northwest Alliance for Computational Science and Engineering, University of Oregon, [retrieved on Feb. 3, 2005]. Retrieved from the Internet: <URL: www.csi.uoregon.edu/nacse/tau>.

Gyllenhaal, John and May, John, "Tool Gear" (online), May 19, 2004, Lawrence Livermore National Laboratory, [retrieved on Feb. 3, 2005]. Retrieved from the Internet: <URL: http://www.llnl.gov/CASC/tool_gear>.

"Performance Analysis Tools" (online), Jul. 15, 2004, Lawrence Livermore National Laboratory, [retrieved on Feb. 3, 2005]. Retrieved from the Internet: <URL: http://www.llnl.gov/computing/tutorials/performance_tools>.

"Parallel Performance Tools" (online), date unknown, University of Wisconsin Computer Sciences, [retrieved on Feb. 3, 2005]. Retrieved from the Internet: <URL: http://www.cs.wisc.edu/paradyn>.

"Kit for Objective Judgement and Knowledge-based Detection of Performance Bottlenecks" (online), date unknown, KOJAK, [retrieved on Feb. 3, 2005]. Retrieved from the Internet: <URL: http://www.fz-juelich.de/zam/kojak.

* cited by examiner

Architecture Overview

Data Gathering

Data Gathering

Data Gathering (continued)

Sanity Checker

Data Flow

Notebook Inspector

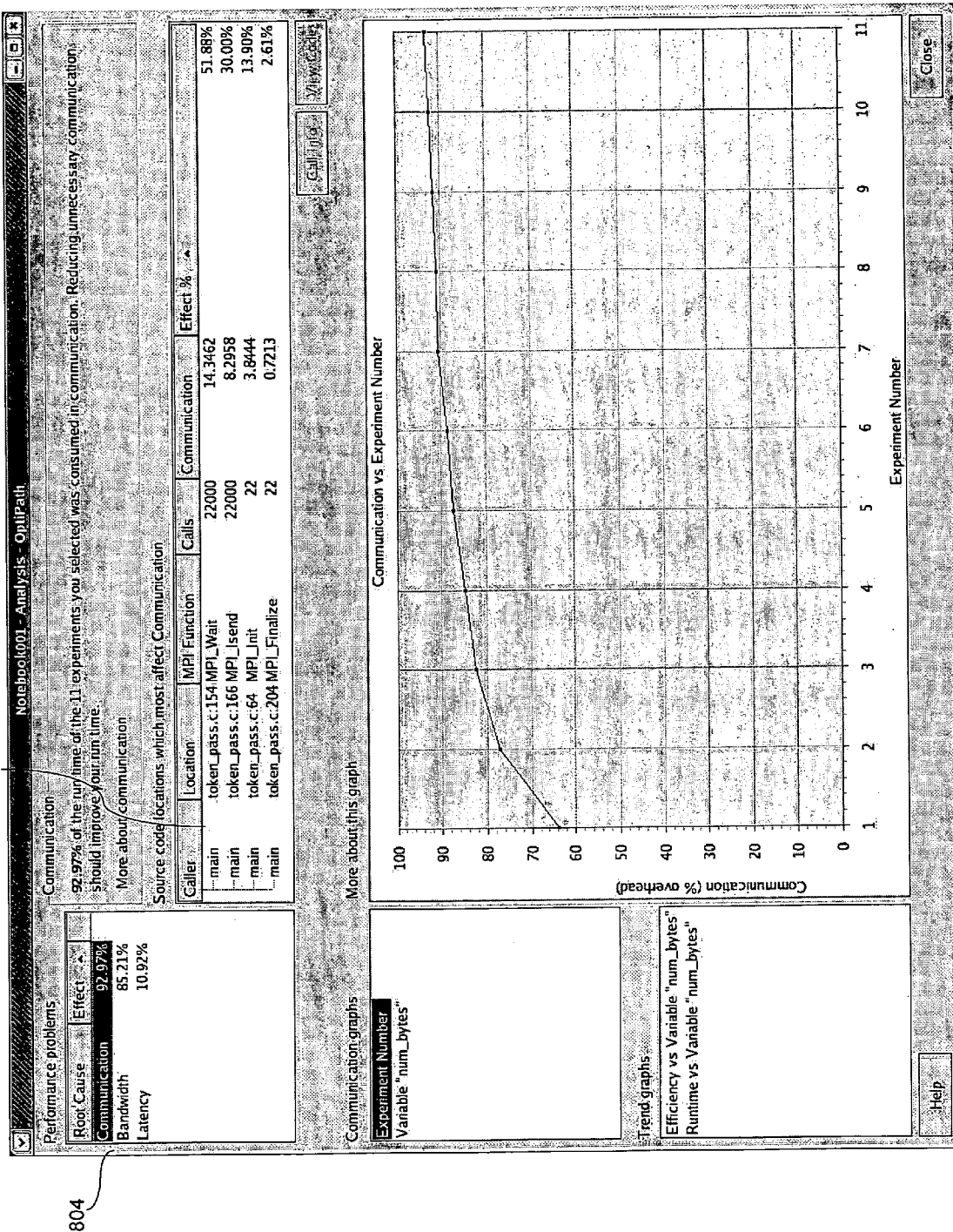
Fig. 8 Communication Effect

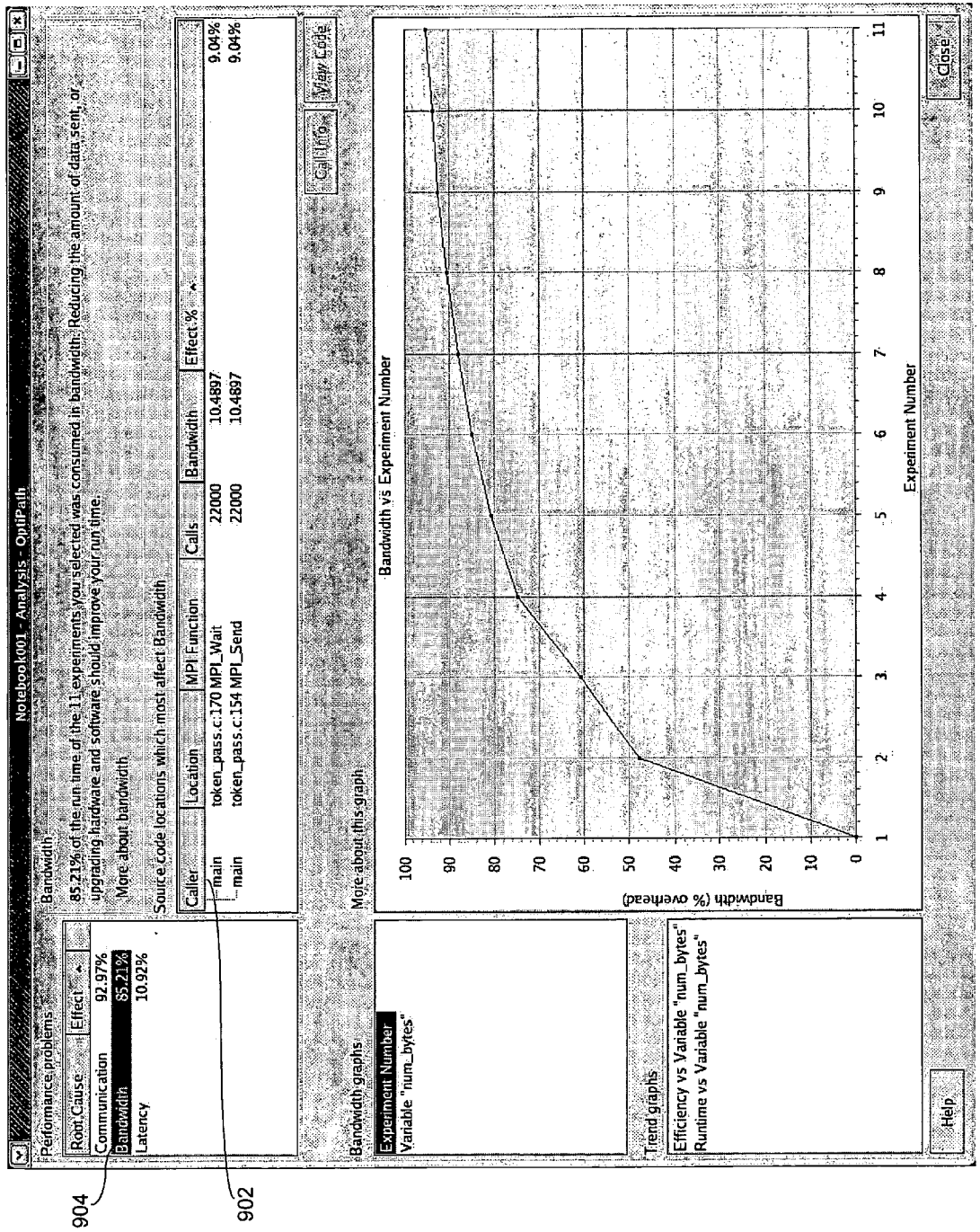
Fig. 9  Bandwidth Effect

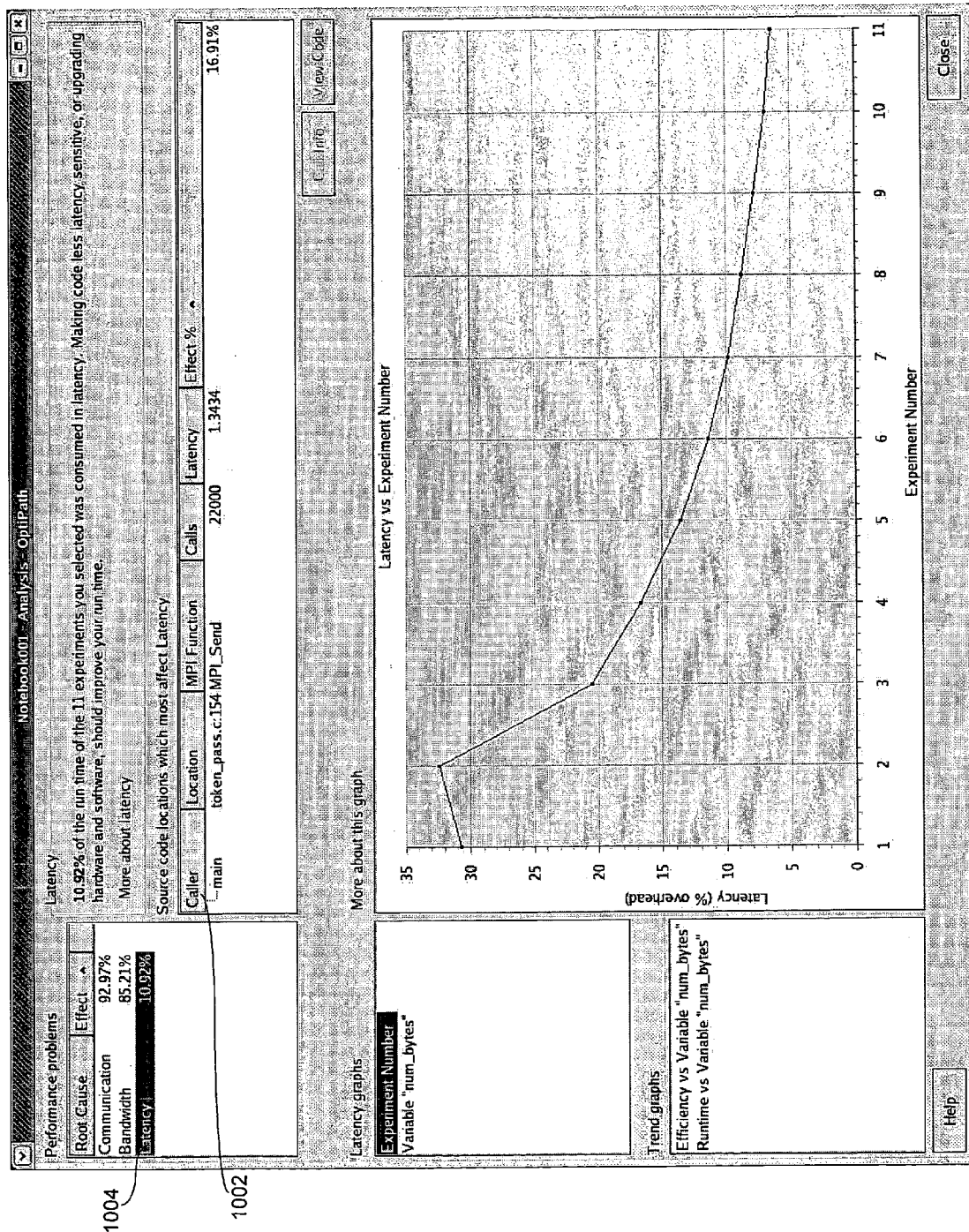
Fig. 10 Latency Effect

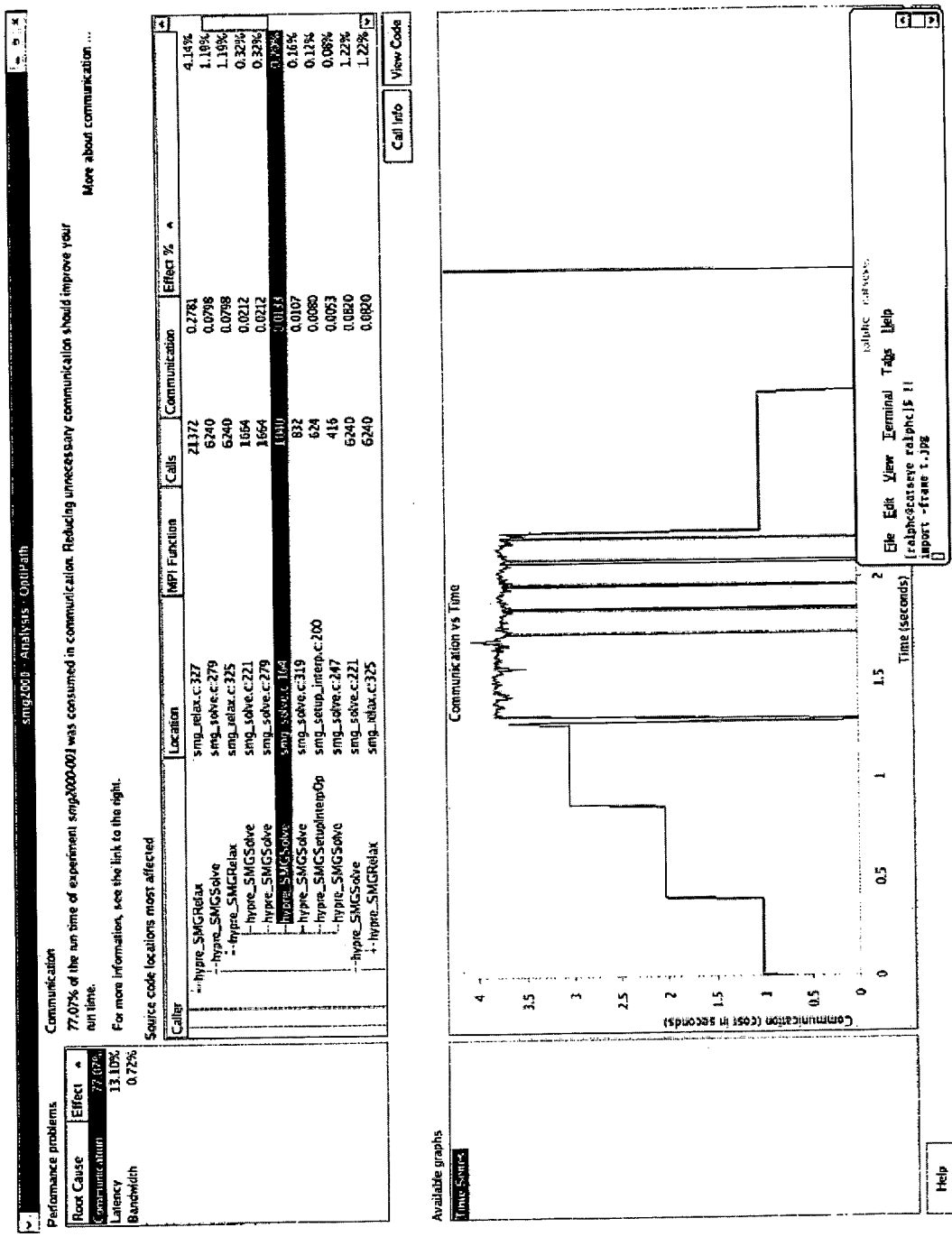
Fig. 11(a)    Vertical bands on Communication Effect, first trace

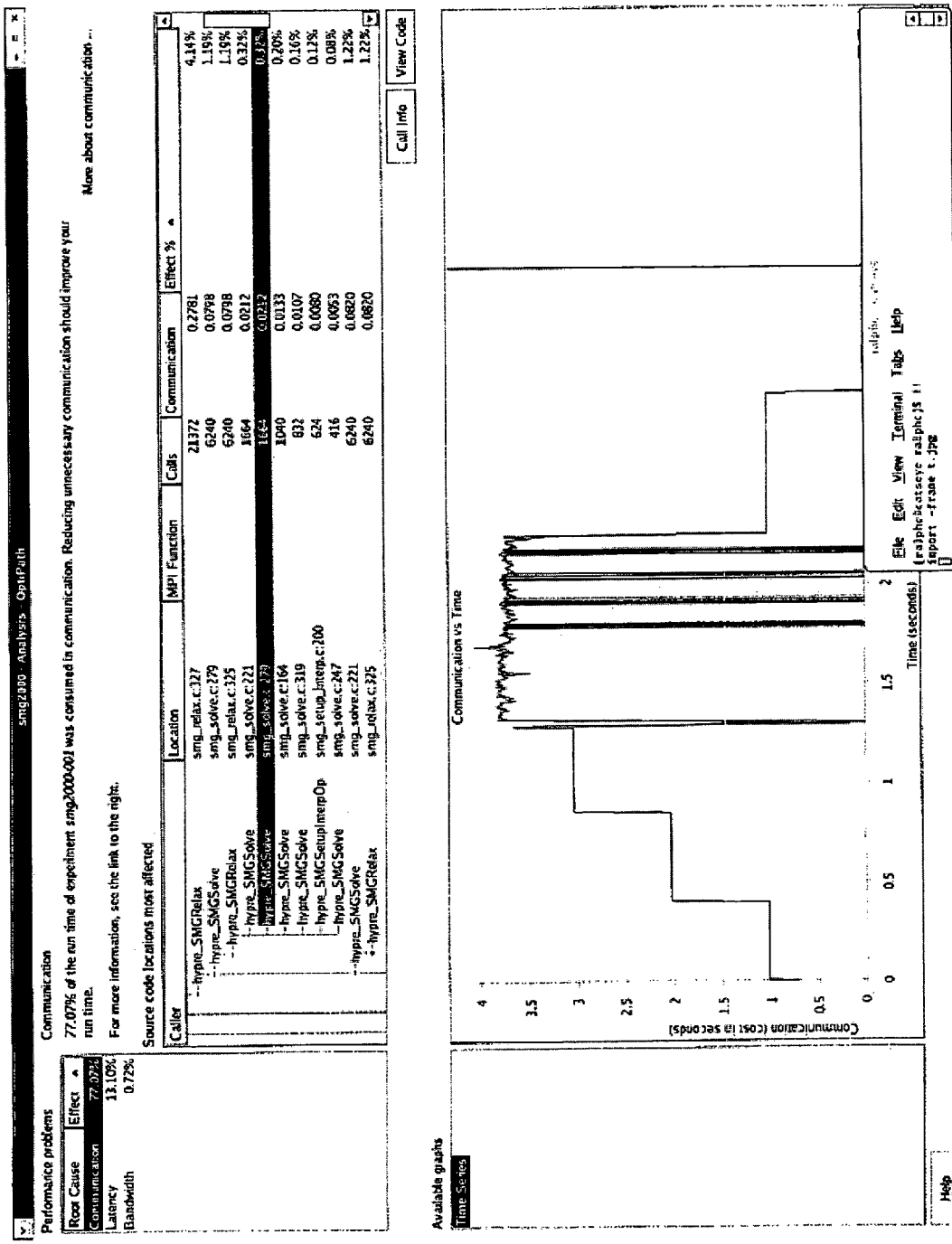
Fig. 11(b) Vertical bands on Communication Effect, second trace

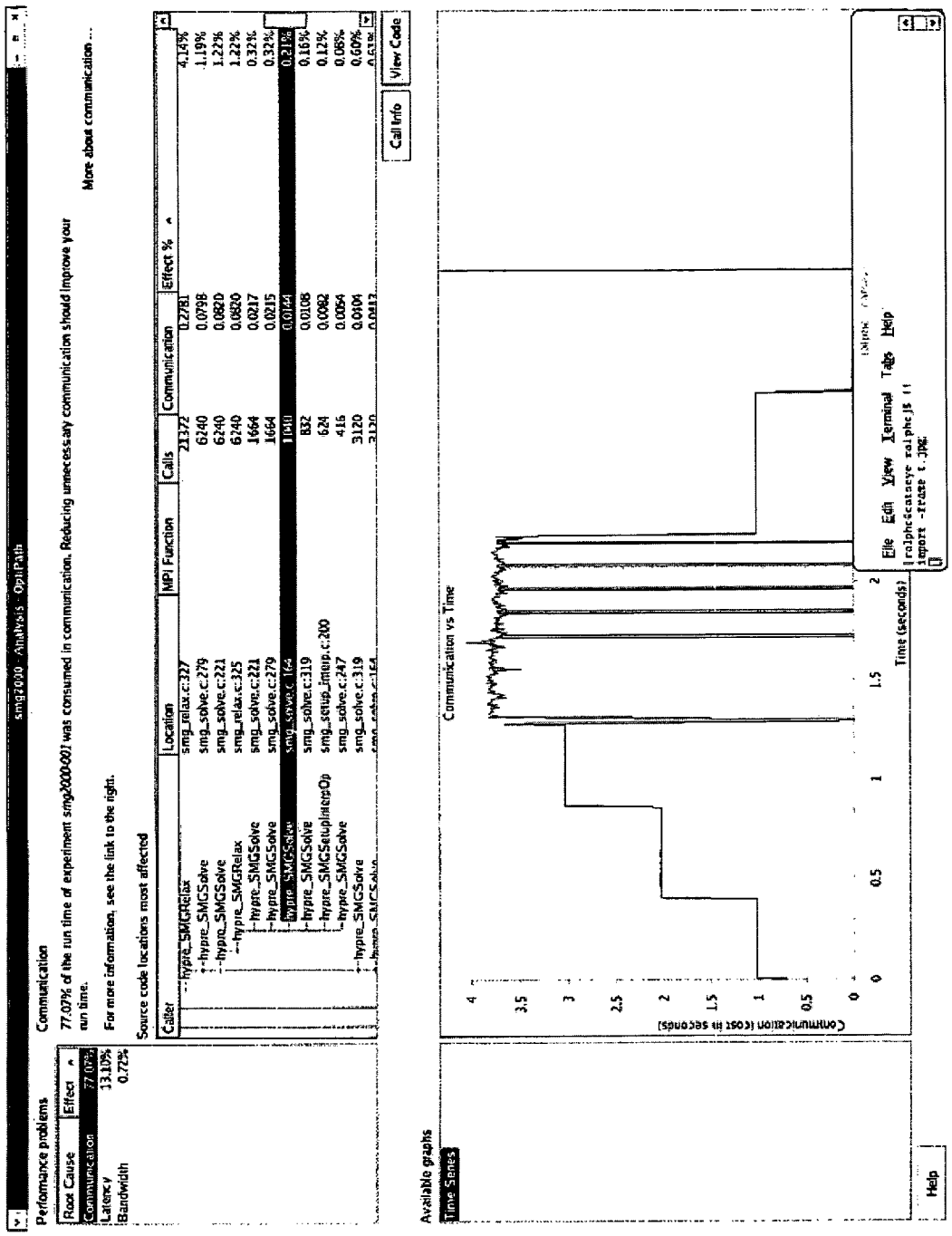
Fig. 11(c)   Vertical bands on Communication Effect, third trace

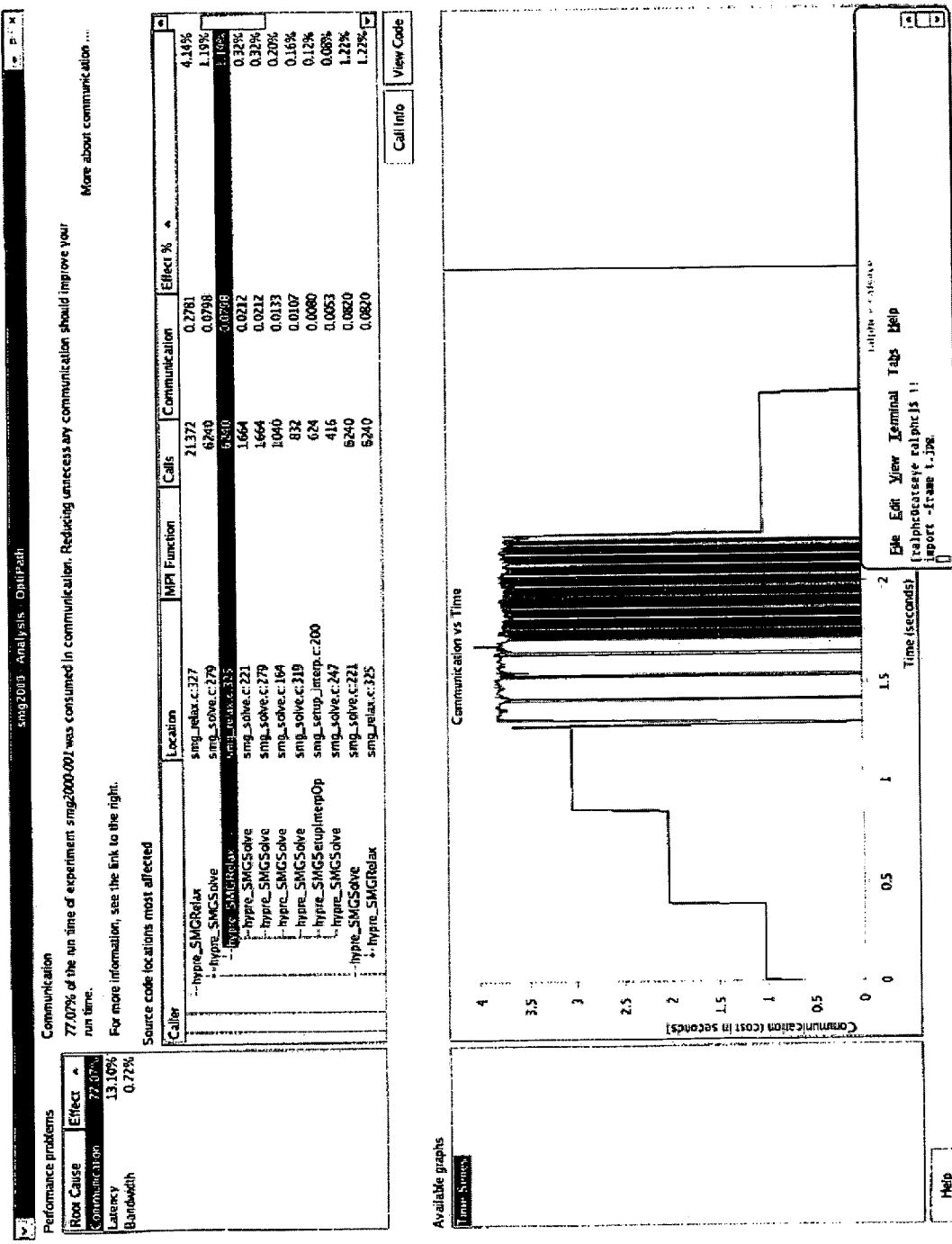
Fig. 11(d)   Vertical bands on Communication Effect, first, second, and third traces

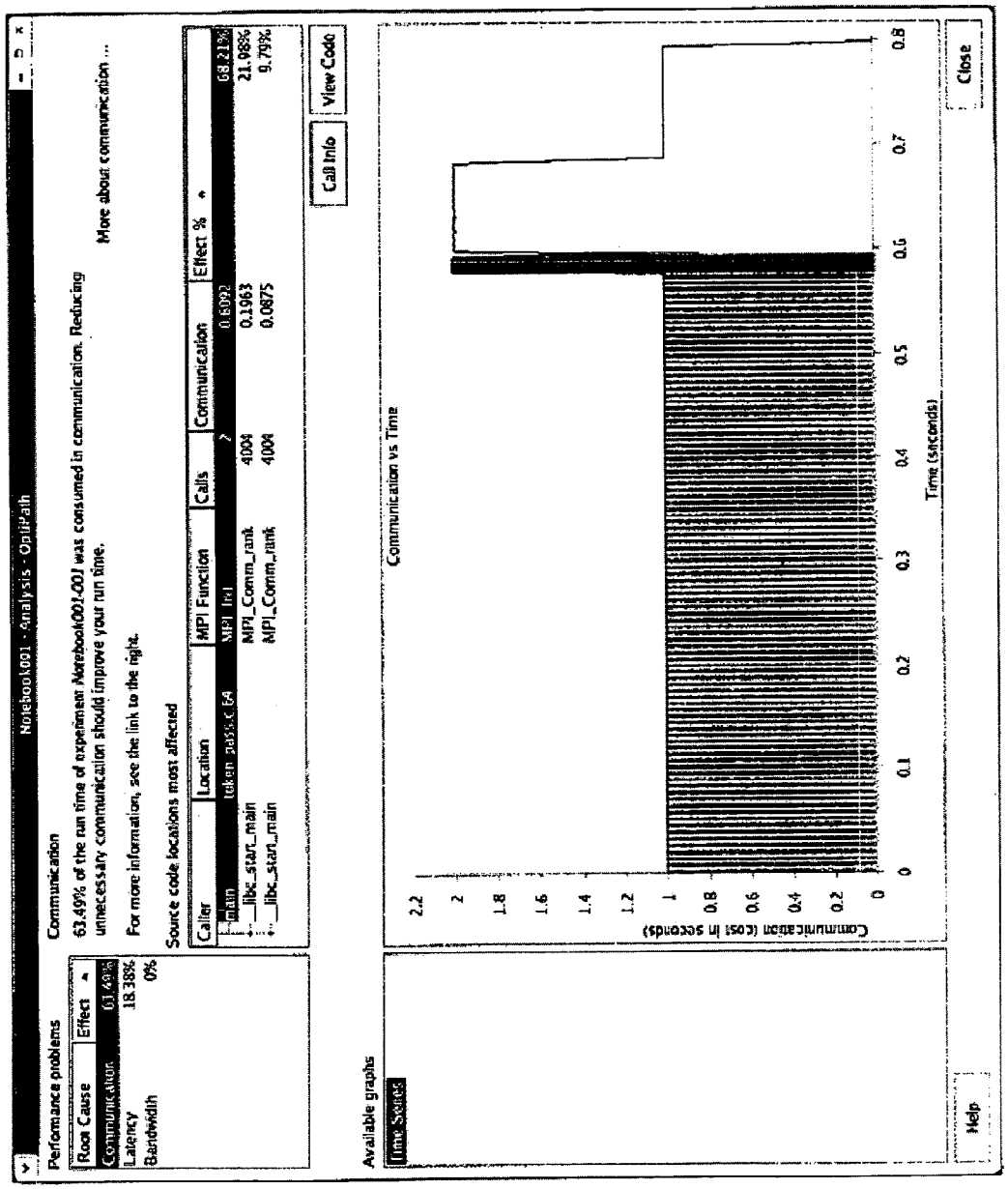
Fig. 12 More Vertical bands on Communication Effect

CLUSTERED COMPUTING MODEL AND DISPLAY

FIELD OF INVENTION

The present invention relates to data networking and specifically to improving performance in a parallel computing application.

BACKGROUND

It is always important in a parallel or clustered computing environment to achieve the best performance. Conventionally, a parallel network is fine-tuned by trial and error, often by trying various network setups until one deemed optimum is arrived at.

Clusters of commodity systems are becoming the dominant platform for high performance computing (HPC), currently making up more than half of the TOP 500 list of the world's fastest supercomputers. Scientists and engineers use clusters to split up an application into a number of cooperating elements, working in parallel on small chunks of the overall problem. These elements are distributed across the individual computers in a cluster, and communicate using, for example, the Message Passing Interface (MPI) Standard.

Within the HPC community, achieving good performance is acknowledged to be a difficult task. It requires expertise, time, and resources. It is particularly difficult to tune applications for commodity clusters formed of commodity machines, as there are few suitable performance tools available; most of those that exist are aimed at standalone systems, not HPC clusters. An efficient parallel application scales almost linearly; when run on ten CPUs, it will run almost ten times faster than on one. Good scaling is difficult to achieve, even to a modest number of CPUs. Not only will an application fail to approach the peak advertised performance of its cluster, the performance curve quickly levels off—and frequently even drops—as the size of the cluster increases. In fact, it is so difficult to scale MPI application performance that managers of clusters at HPC facilities often limit their users to running applications on no more than 16 or 32 CPUs at a time, based on anecdotal belief that adding additional processors will not improve or will decrease performance. Using larger numbers of CPUs yields so little benefit for many applications that the extra compute power is effectively wasted.

A seasoned developer of parallel applications has a "toolbox" of techniques for tuning an MPI application to perform better. Typical approaches to finding performance problems include:
  Time the application's performance at different cluster sizes, and plot the speedup they achieve for each size. For an untuned application, this curve will quickly flatten out, at about 4 CPUs.
  Profile the serial portions of the code, to find and fix per-CPU bottlenecks. This is often sufficient to bring the cluster size where an application starts "losing steam" from 4 CPUs up to perhaps 16.
  Instrument the application to measure the amount of time it spends computing and communicating. Compare the ratio of these two values at different cluster sizes. Find the communication hot spots as the cluster size grows, and fix them.

Each of these techniques requires a substantial amount of manual work—instrumenting the application; cataloging performance numbers; plotting charts; tweaking the application's behavior; and repeatedly trying again. It is difficult to apply them blindly; a parallel programmer has to develop a body of experience to know which methods to try, and which numbers are significant.

SUMMARY OF INVENTION

A preferred embodiment of the present invention provides a way of gathering performance data during execution of an application executing on clustered machines. This data is then presented to the user in a way that makes it easy to determine what variables and situations to change in order to improve performance.

The described embodiments liberate a user or systems administrator from the need to take months-long detours into becoming an MPI performance tuning expert. The present invention can be implemented to support the most popular 32- and 64-bit HPC platforms; the most widely used Linux distributions; and a variety of cluster interconnects. Most importantly, the described tools guide the user straight to the root causes of his application's performance problems, and starts him or her on the road to fixing them.

In addition, in the described embodiments, the color of displayed vertical bands indicates how much a particular call or calls from one or more nodes in one or more experiments is contributing to the effect of communication time, latency, and bandwidth.

The tools, in accordance with the present invention, present a user with a ranked list of the performance problems they find. For each problem, the tools display graphics indicating when, and how much, the problem occurs. The tools pinpoint every location within your code where a problem occurs, ranked by severity, and annotated with complete context. The tools provide explanations for why such problems frequently occur, and suggestions for effectively fixing them.

Such tools eliminate much of the mental effort, manual data gathering, and repetition of traditional performance analysis, by automating the parts of the process that ought not to require human intervention. In addition, the tools are structured to make light work of the performance analysis and tuning process. The tools provide a powerful graphical user interface, and complete control from the command line for the times when a user wants to write scripts.

The tools make organizing performance experiments simple, by collecting them into Groups called "notebooks." Each notebook a tool for letting the user group experiments together that is meaningful to the user. A collection of experiments might be comparing different versions of the program, different runs of the same program with different data values, or runs on different collections of computers, etc.

In a preferred embodiment, the tool displays graphs for three "effects": communication, bandwidth, and latency. These effects can be viewed for an application overall or for various portions of the program.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 8 is an example screen shot showing a graph for a selected root cause "communication."

FIG. 9 is an example screen shot showing a graph for a selected root cause "bandwidth."

FIG. 10 is an example screen shot showing a graph for a selected root cause "latency."

FIG. 11(a) is a screen shot showing vertical bands, corresponding to a first selected portion of a trace, that are interposed on a graph of communication effect.

FIG. 11(b) is a screen shot showing vertical bands, corresponding to a second selected portion of the trace, that are interposed on a graph of communication effect.

FIG. 11(c) is a screen shot showing vertical bands, corresponding to a third selected portion of the trace, that are interposed on a graph of communication effect.

FIG. 11(d) is a screen shot showing vertical bands, corresponding to the first, second, and third selected portions of the trace, that are interposed on a graph of communication effect.

FIG. 12 is a screen shot showing vertical bands, corresponding to a selected portion of a trace, that are interposed on a graph of communication effect.

DESCRIPTION OF PREFERRED EMBODIMENTS

General Discussion

In contrast to the conventional trial and error method, the tools in a preferred embodiment of the present invention operate as follows: An administrator tells the tools just once how to run an application, and how to change a few variables that might affect performance—such as cluster size, model resolution, or the data sets to use. An administrator can follow the tools' suggestions for the kinds of experiments to run, for example "run at cluster sizes 2, 4, 8, 16, and 32." With a few clicks, he can run a batch of experiments. If he needs to, he can run more experiments later, or rerun the same ones to check their consistency. The administrator will be brought straight to the worst problems, right down to the exact lines of code affected. He will be presented with an application's performance trends as the number of CPUs or a model resolution change. He can read about why the problem may be occurring, and what he can do to fix it.

Once he has made some changes to the application, he clicks once to rerun the entire suite of experiments, then compares the "before" and "after" analyses.

Software and Hardware Compatibility

The described tools are designed to be flexible. The described embodiments support both AMD and Intel's 32-bit x86 (Athlon, Pentium, Xeon) and 64-bit x86-64 (Athlon 64, Opteron, Xeon 64) processor lines, although the invention is not limited to these processors or manufacturers. In addition, the tools running on one supported processor platform can run applications on, and analyze data from, any other. The described embodiment supports the two major branches of Linux distributions used in HPC—Red Hat Enterprise and Fedora Core, and SuSE Enterprise and SuSE Professional. In addition, the described embodiment supports two major batch scheduling systems, Sun Grid Engine and Torque (PBS). The described embodiments of the tools work with PathScale's InfiniPath interconnect, Fast and Gigabit Ethernet, and certain Infiniband host adapters and switches, although the invention is not so limited.

Some Embodiments

Figure 1:
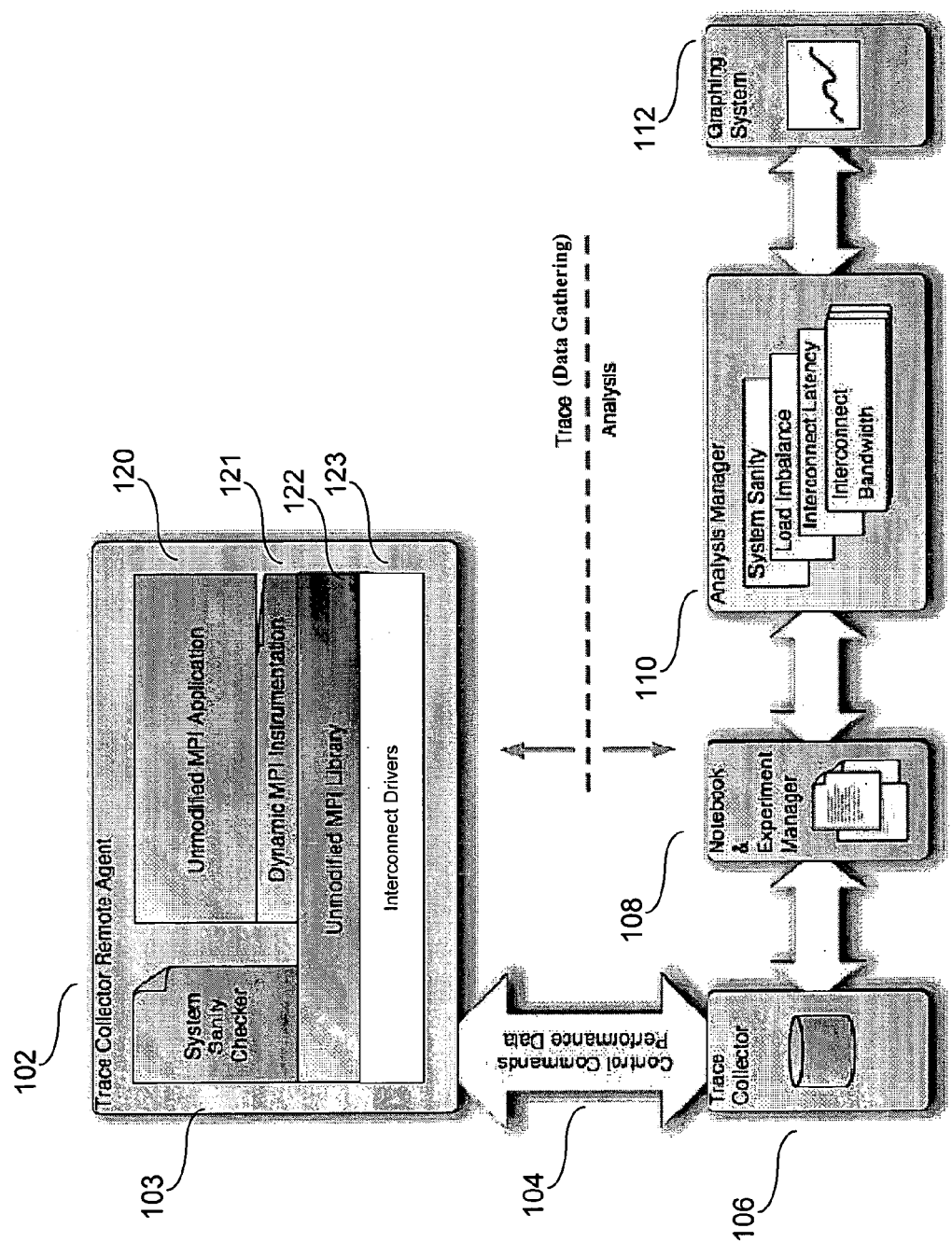
FIG. 1 is an architectural overall view of a preferred embodiment of the present invention.

FIG. 1 is an architectural overall view of a preferred embodiment of the present invention. This description applies to the MPI standard, version 1.1, June 1995, (See http://www.mpi-forum.org/), which is herein incorporated by reference, although it will be understood that the invention can be implemented using other protocols. The collector program handles starting N copies of a user program on M different machines (nodes) and arranges for the program to dynamically load the modified MPI trace library between the program and the normal, unmodified MPI library. Usually N=M but it can also run more than one program on the same machine (for example, running two copies of the user's program on a dual processor machine).

In FIG. 1, each node in the system running a particular application 120 contains a remote trace collector 102 that gathers data from other the node about the execution of MPI application 120 in that node. In general, multiple nodes in the system will execute the same application 120 for different subsets of data. Thus, each node will have a remote trace collector agent 102. The trace collector 102 optionally executes a sanity checker 103, which is described in detail later. Each node contains dynamic MPI instrumentation 121, which presents a standard MPI interface to application 120, but which contains additional instrumentation to communicate data to trace collector 102. Dynamic MPI instrumentation 121 communicates with a set of unmodified MPI library routines 122, which connect to interconnect drivers 123. Interconnect drivers 123 in each node allow the node to communicate with other nodes in the system.

As further shown in FIG. 1, the remote trace collectors 102 communicate with a central trace collector 106, which gathers data from each of the remote trace collectors. The trace data is communicated to a notebook and experiment manager 108, which communicates with an analysis manager 110. Analysis manager performs analysis on the data and the data and analysis results are then presented to a user or system administrator using a graphing system 112. The actions of the trace collectors are collectively known as data gathering. The actions after trace collecting are collectively known as analysis. Unlike other MPI performance tools, the trace collector does not force a user to recompile or relink his application.

Figure 2:
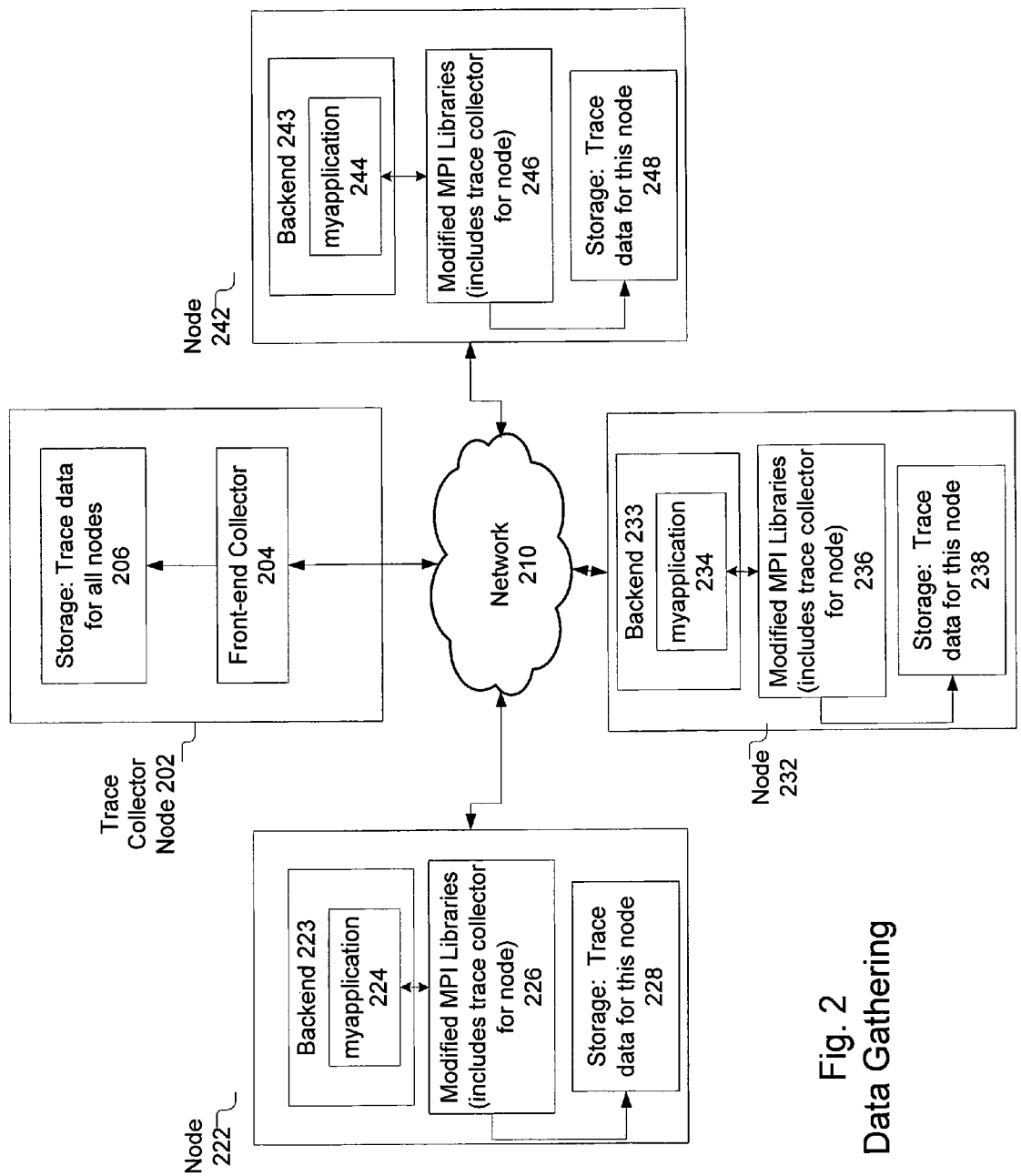
FIG. 2 is a block diagram of an example network in which the present invention may be used.

FIG. 2 is a block diagram of an example network in which the present invention may be used. It includes a main trace collector node 202 and three other nodes in the system 222, 232, and 242. The nodes in this example communicate via a network 210.

Main collector node 202 includes a front-end collector 204, which is preferably implemented as software and storage 206 for trace data collected from nodes 222, 232, and 242. Each of nodes 222, 232, and 242 includes a backend 223, which is preferably implemented as software and which contains an application (for example, myapplication 224, 234, 244). As discussed above, applications 224, 234, and 244 are preferably the same application, executing on each of the nodes. Each node also contains modified MPI libraries 226, 236, and 246 and storage 228, 238, 248 for trace data for that node.

Figure 3A:
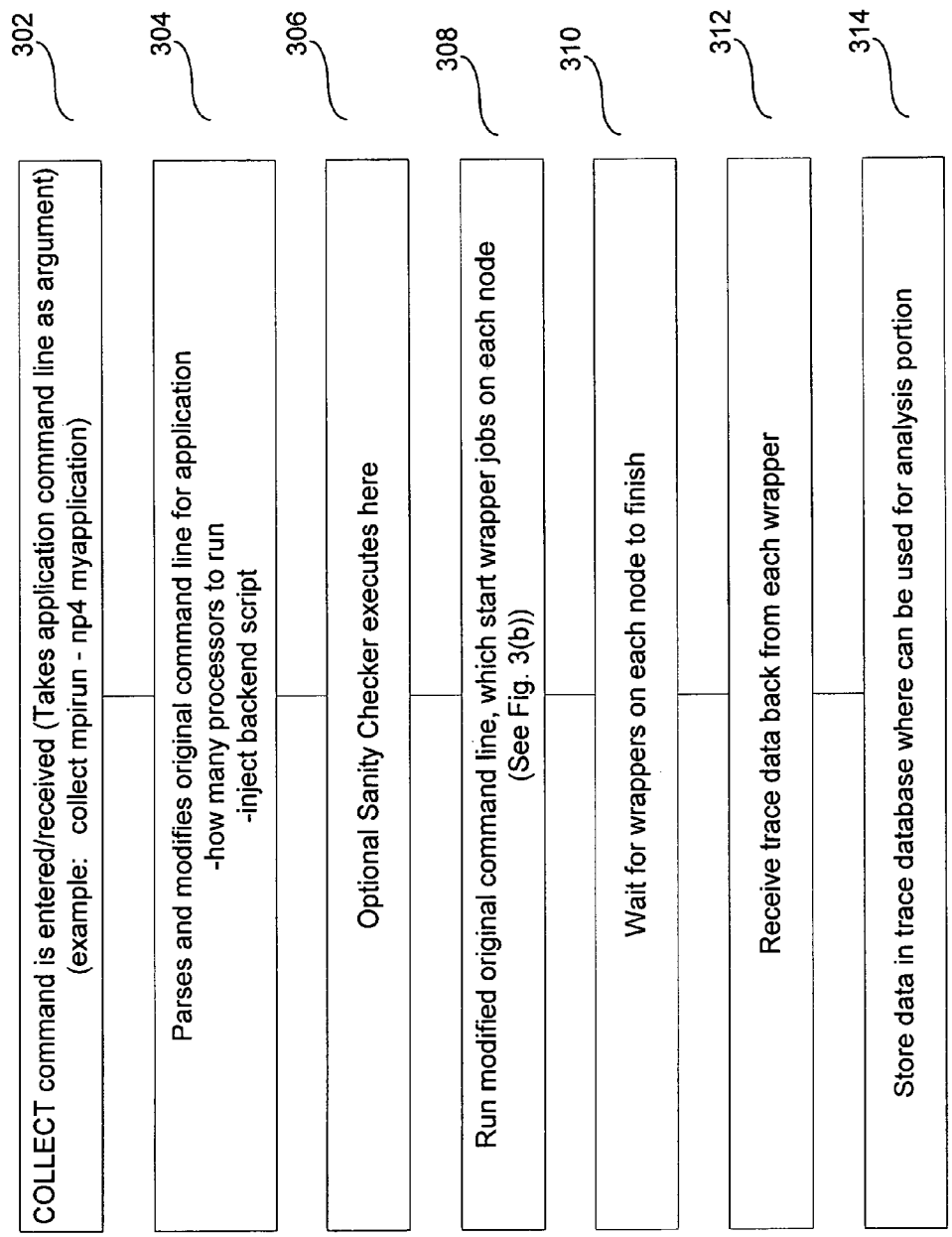
FIG. 3(a) is a flow chart showing a data gathering method in accordance with a preferred embodiment of the present invention.
Figure 3B:
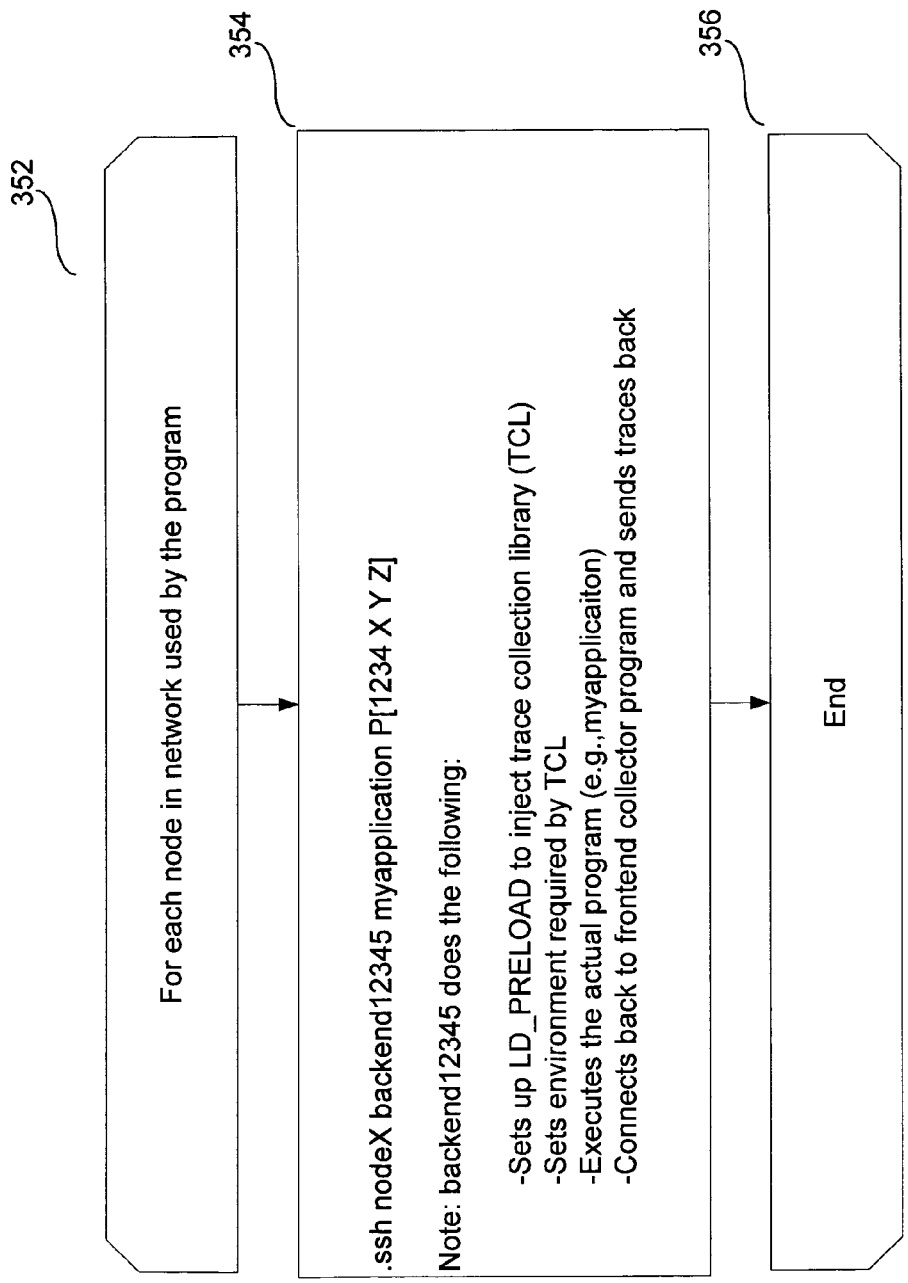
FIG. 3(b) shows additional details of FIG. 3(a).

FIG. 3(*a*) is a flow chart showing a data gathering method in accordance with a preferred embodiment of the present invention. In a preferred embodiment, elements 302, 304, and 306 are performed by the main trace node 202. In element 302, the main trace collector receives a command (such as but not limited to, for example, a command typed by a user). This command may be, for example:

collect mpirun -np 4 myapplication

The "mpirun -np 4 myapplication" portion is a standard MPI command, but here, it becomes a parameter for the "collect" command, which initiates gathering of trace data.

Element 304 parses and modifies the original command line to determine data, such as how many processors to run (np4) and injects a background script.

Element 306 executes a sanity checker, which will be described below in more detail. In the described embodiment, the sanity checker gathers data about system latency and bandwidth.

Element 308 runs the modified original command line to start a wrapper job on each node as described in more detail in FIG. 3(*b*).

Element 310 waits for the wrapper jobs on each node to finish.

Element 312 (executing on the main trace node) receives trace data back from each wrapper.

Element 314 stores the received trace data in storage 206.

FIG. 3(*b*) shows additional details of FIG. 3(*a*). Element 354 is performed by the main trace node for each node that will be executing the program (shown as 352). For each node, the main trace node performs an "ssh" operation (or similar operation) to send a backend wrapper to each node. In the described embodiment, the backend wrapper includes instructions to perform at least the following:

set up LD-PRELOAD to inject a trace collection library in the node set up any environment required by the trace collection library such as MPI_TRACE_FILE_NAME, which specifies the file name 228, 238, 248 where trace data should be written locally.

executes the actual program (for example, myapplication)

connects back to the frontend trace collector program and sends back trace data for this node.

In a preferred embodiment, the remote tracing library records the following data for each MPI library call the program makes on a node (these are preferably stored in a compressed format to impact execution time as little as possible):

A number indicating which MPI call this record is for.

The start time (a 64 bit integer read from the CPU cycle register. Usually this has nanosecond resolution or better)

The end time (preferably the same resolution as start time)

Stack back trace leading to the MPI call (this is an array of 32 or 64 bit subroutine return addresses)

The return value of the MPI call (an integer)

The input argument values (these are different for each MPI call)

The output argument values (these are different for each MPI call)

In addition, the collector records some data for the process as a whole such as the path name of the user program being recorded, the name of the machine it was run on, the network IP address, and the time the process started and ended (shown as 356).

It will be understood that other embodiments of the invention may collect data that are subsets and/or supersets of the above-described data.

Figure 4:
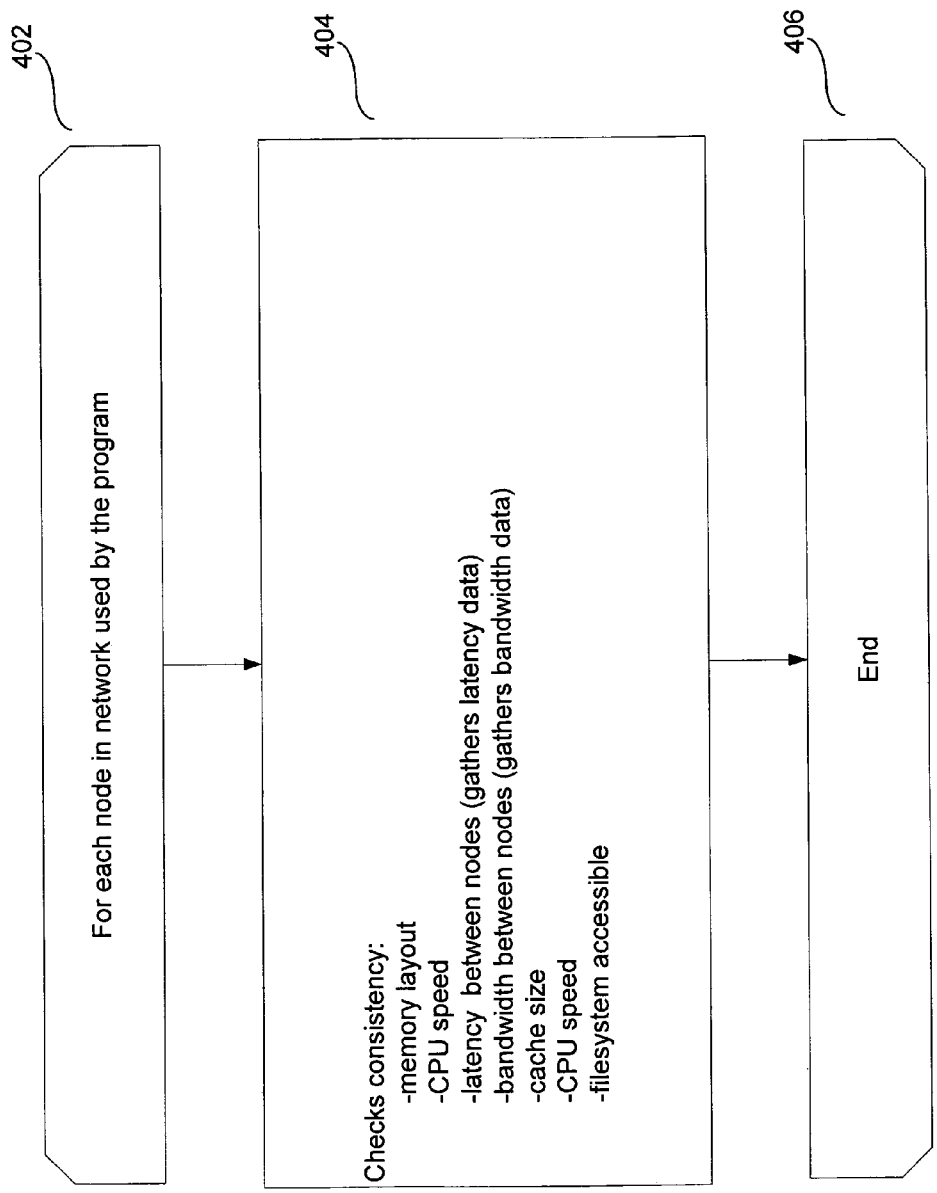
FIG. 4 is a flow chart of a sanity checking method in accordance with a preferred embodiment of the present invention.

FIG. 4 is a flow chart of a sanity checking method that begins in step 402 and ends in step 406, in accordance with a preferred embodiment of the present invention. For each node in the system that will execute the application, the sanity checker checks the consistency of the memory layout, CPU speed, latency between nodes (i.e., gather latency data), bandwidth between nodes (i.e., gathers bandwidth data), cache size, CPU speed, and filesystem accessibility. Each of these variables can affect the speed at which a particular application "myapplication" executes on each of the nodes. It will be understood that usually, the same application will not execute at the same speed and efficiency for each node in the system.

Further to the above, in a preferred embodiment, the sanity checker is intended to check a number of system configuration values, which could affect the performance of an MPI application. Examples are: whether all CPUs are the same brand, chip revision level, clock rate, and cache sizes, whether all systems have the same amount of physical memory, swap memory, and similar I/O latency and bandwidth values. The sanity checker may also determine whether the network latency and bandwidth between all pairs of nodes should be the same or very similar.

In the described embodiment, the sanity checker currently only uses two nodes to measure network latency and bandwidth. Latency is measured by using the MPI library calls to send zero byte length messages a number of times, take the minimum time, and write that value to the standard output which is captured by the collector when it runs the sanity program. The same is done for bandwidth but using 100,000 byte messages. This is a commonly used technique referred to as a ping pong test. The measured values are assumed to be the same between the other nodes. Other embodiments may use more extensive tests or may use estimates obtained by other methods.

Some embodiments will display a warning or notice message if the other node's values are not similar.

Figure 5:
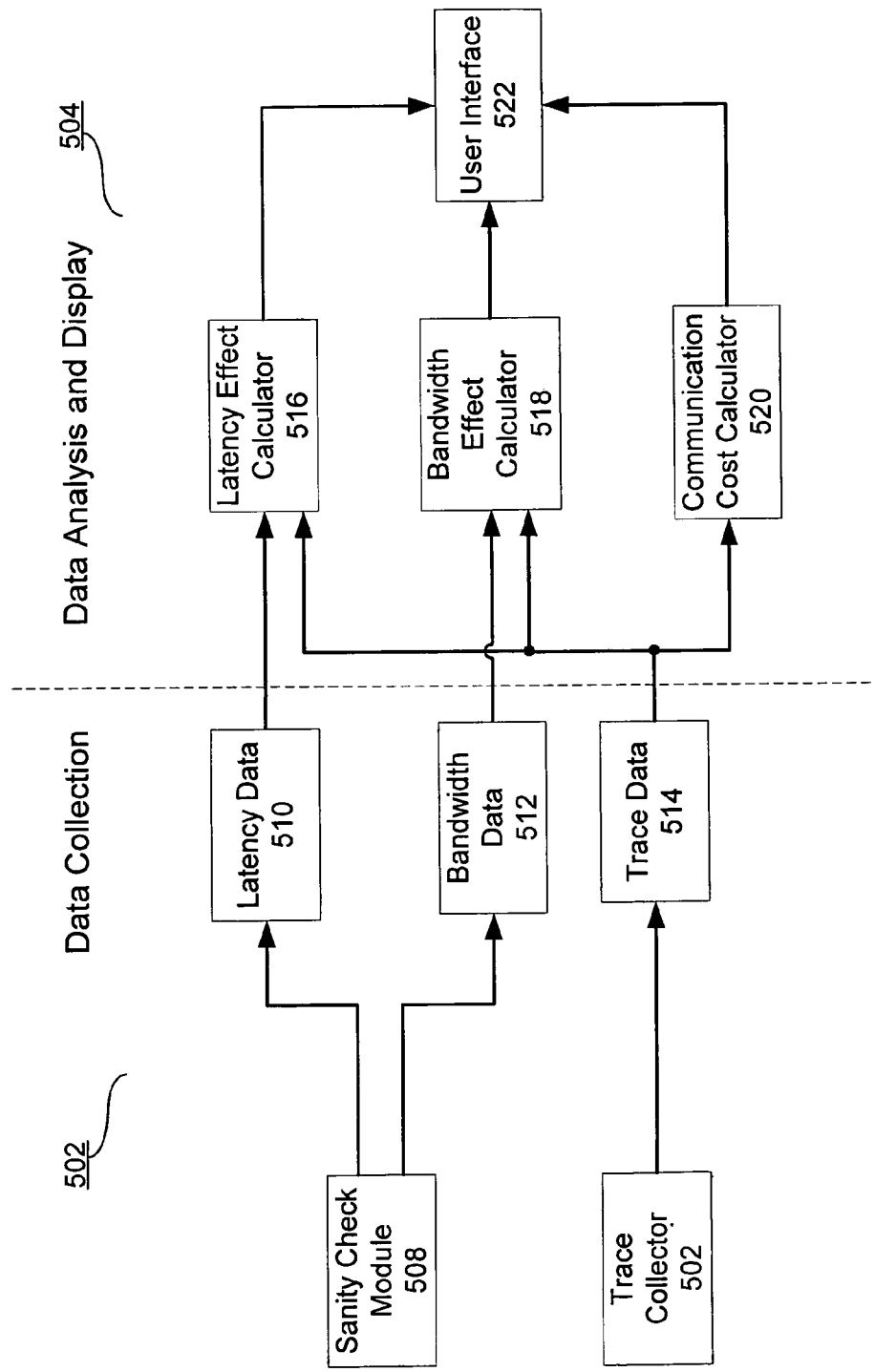
FIG. 5 is a data flow diagram.

FIG. 5 is a data flow diagram. It shows that sanity checker 508 gathers latency data 510 and bandwidth data 512 and that trace collector 502 gathers trace data. In other embodiments, latency data and/or bandwidth data can be obtained from other sources or be estimated, or specified by the user. Trace data 514 and latency data 510 are used by a latency effect calculator 516 to generate information about latency effects in the system. Trace data 514 and bandwidth data 512 are used by a bandwidth effect calculator 518 to generate information about bandwidth effects in the system. Trace data 514 is used by communication cost calculator 520 to generate information about communication effects in the system. The data about latency effects, bandwidth effects, and communication effects are used by user interface 522.

FIGS. 6-12 show some examples of a tool in accordance with the present invention. These examples are presented for the purpose of demonstration and are not meant to limit the scope of the invention. The described embodiments of the present invention include tools that present a powerful graphical user interface that lets a user run, analyze, and manage performance experiments.

Figure 6A:
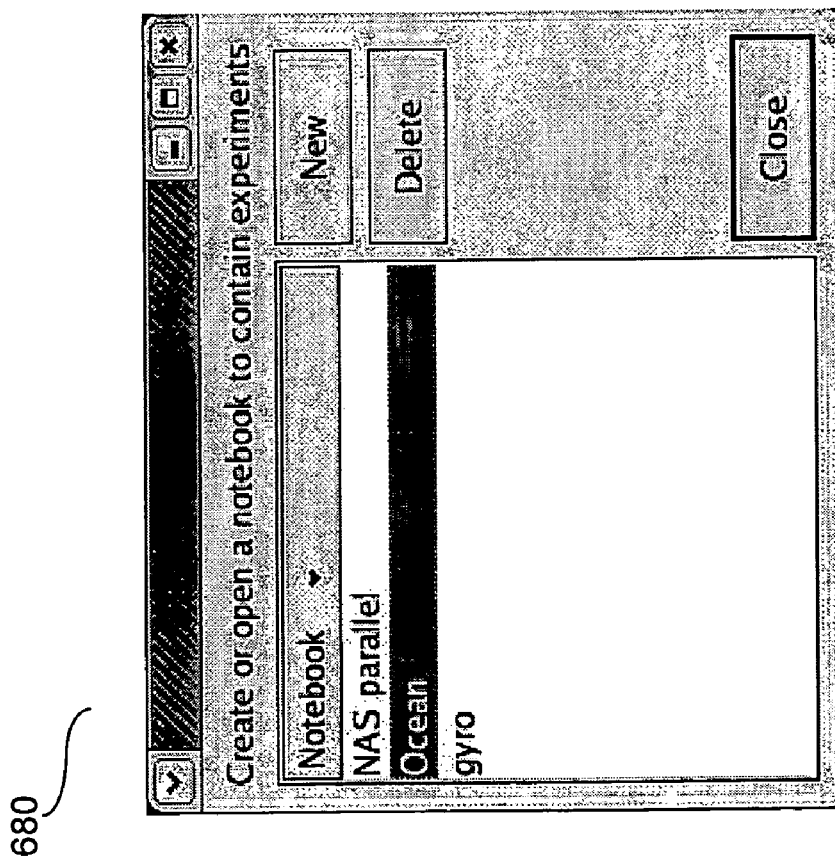
FIG. 6(a) is an example of a notebook window in accordance with a preferred embodiment of the present invention.
Figure 6B:
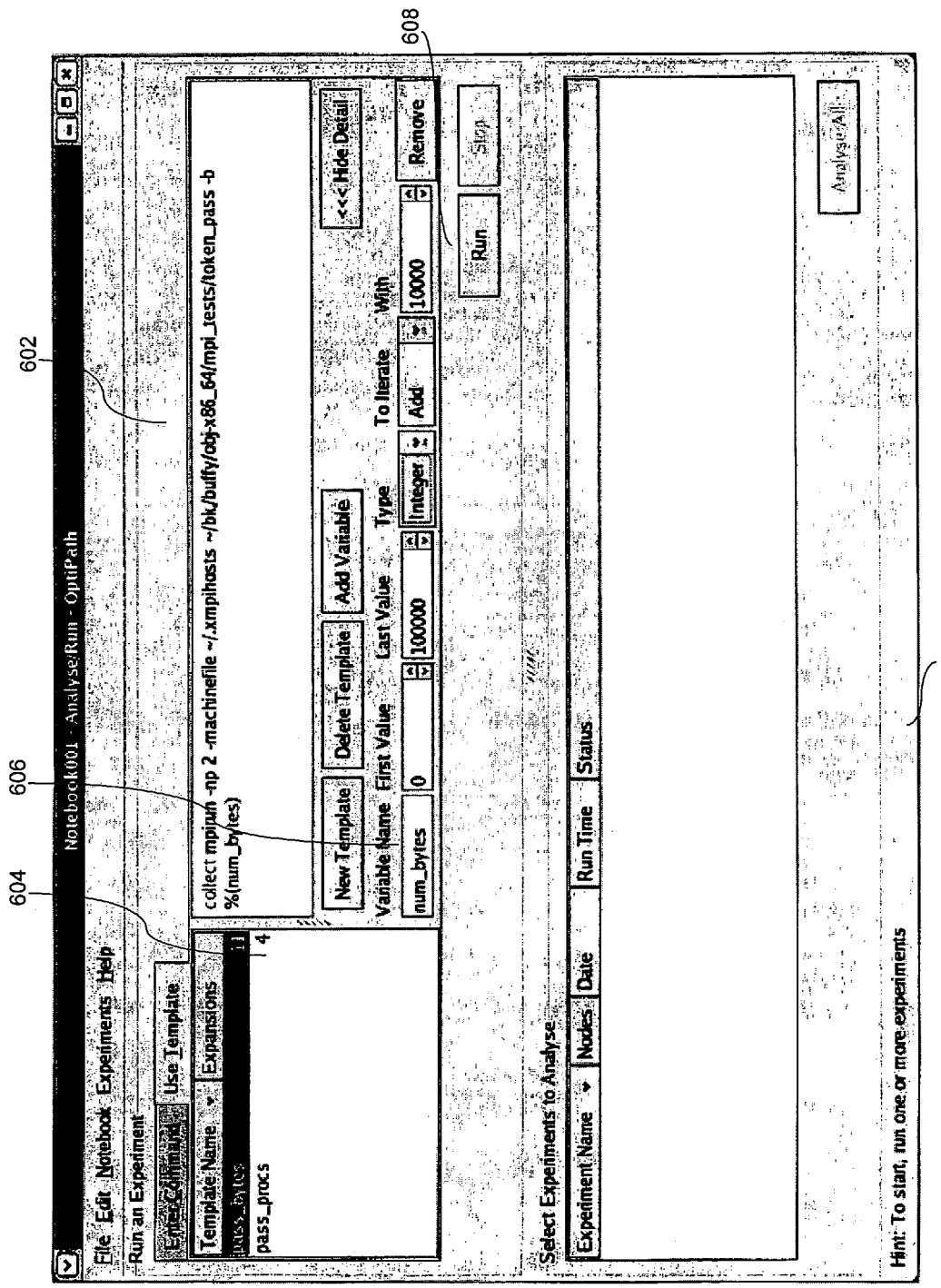
FIG. 6(b) is an example screen shot showing a tool in accordance with an embodiment of the present invention.

The notebook inspector 680 in FIG. 6(*a*) lets a user create and select a notebook to work in; when the user does not need this window, he can hide it. Selecting a line in the notebook list changes the view of experiments listed in the bottom section of FIG. 6(b) or 7. The top portion of FIG. 6(b) does not change in the described embodiment, although it can change in other embodiments (for example it can be different for each notebook). The experiment window (the large window 612 in FIG. 6(b)) allows a user to run and analyze experiments.

To run an experiment, a user can choose from one of several options:
- Click on an experiment he has run before, to recall the command line it used
- Type in a new command line to execute
- Use a template to automatically run a series of experiments under different conditions Templates are a powerful mechanism, letting the user control one or more variables during each run of an experiment, without forcing the user to retype a new command line every time. The tools handle the analysis of individual and multiple experiments differently. For a single experiment, the tools give details on that one experiment, displaying graphs of its performance over time.

When a user analyzes multiple experiments, the tools identify problems and trends across all of those experiments. In each case, the tools present a user with the root causes of his performance problems; the locations within the source code where those problems occur; and graphical data that let the user visualize the problems. In addition, the tools provide a user with details regarding the likely causes of each problem, along with approaches he can use for solving these problems.

The notebook and experiment manager is responsible for a system's performance data. It maintains a history of the experiments that have been run, so a user can rerun complex batches of experiments with a single click. It also precaches and saves analyses, to give you faster first-time access to the analysis of large, intensive computations.

The analysis manager maintains the engines that perform individual analyses. Our analysis architecture achieves accuracy without sacrificing speed. The graphing system provides visual interpretations of both time series and trend data. It identifies repeats, variations and missing values in data, and automatically chooses the most appropriate information to present.

FIG. 6(b) is an example screen shot showing a tool in accordance with an embodiment of the present invention. After the sanity data and trace data have been collected, the user can at any time run the analyzer and display the analysis results. In the described embodiment, there are three analyses that are produced: communication time, latency, and bandwidth effect on the execution time of the program. All three analyses are displayed the same, the difference is how the displayed value is computed. Other embodiments provide more analyses and more or different ways of displaying them.

FIG. 6(b) includes a display of the command entered 602. Here, the command is:
Collect mpirun -np2-machinefile ~/.xmpihosts ~/bk/buffy/obj-x86_64/mpi_tests/token_pass -b%(numbytes)

An area 604 selects a template to edit in a top right portion of FIG. 6(b) (i.e., in area 602). Selecting different template names will change the text displayed in area 602 and the list of variables in area 606. Area 606 displays a name of a variable in the command 602 (e.g., num_bytes) and allows the user to set various values to be used in the display. Here, a user has selected a first value of "0" and a last value of "10,000" for the variable num_bytes. The type is an integer, and the display is to iterate from 0 to 10,000 upwards by adding 10,000 with each iteration. When the user selects a Run button 608, the user-indicated analysis is performed as described later.

Figure 7:
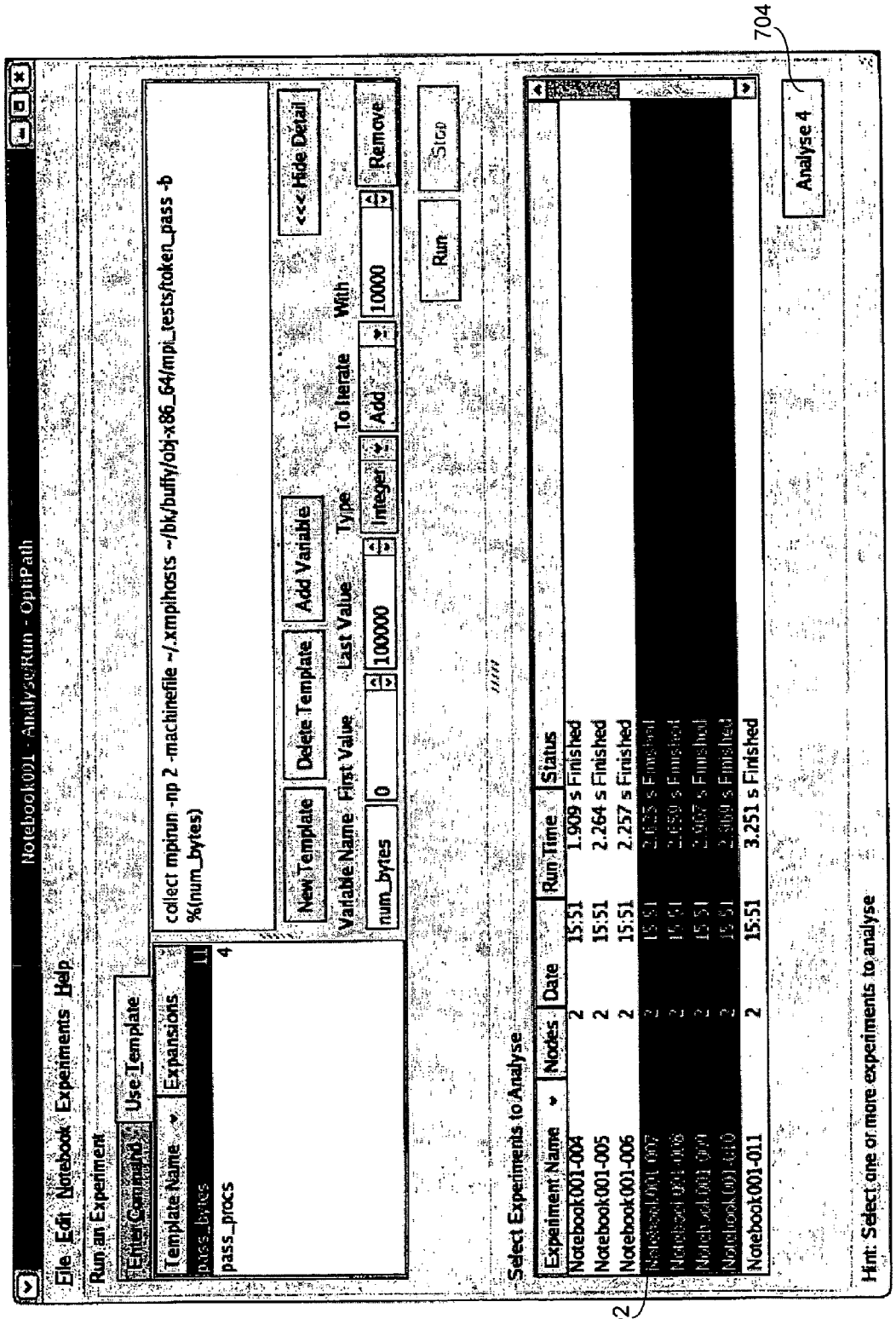
FIG. 7 is an example screen shot showing that a user has selected several "notebooks" in an "experiment."

FIG. 7 is an example screen shot showing that a user has selected four "notebooks" "experiments" 702. In the described embodiment, the experiment name defaults to be the notebook name plus "-001" and so on, but the user can rename experiments so it does not have to match the notebook name or have a number appended. The indicated analysis will be performed for these notebooks. When the user selects an "analyze 4" button 704, the analysis is performed by the selected variable(s) and the selected notebooks.

FIG. 8 is an example screen shot showing a graph for a selected root cause "Communication" 804. The regions 804 list the root causes (not the template names, as in FIG. 6(b)). Note that information about the trace data collected is displayed in an area 802. This includes a tree structure showing a caller routine, a location in the source code (if debug information for the program is known), the MPI function called, the number of calls made for the particular caller and for the selected experiments, a communication number reflecting an effect that communication time had on total execution and a communication percentage reflecting a percentage effect that communication time had on the total effect.

The graph shows changing communication effect as the number of bytes transmitted per packet increases from 0 to 100,000 in 10,000 unit increments. The Y axis reflects a percentage (0-100%). Each "experiment" is a separate run of "myapplication" with a different number of bytes. The points on the graph are from the individual experiment's "Root Cause Effect" number displayed in 804. The X axis is the number of bytes that the experiment was run with.

FIG. 9 is an example screen shot showing a graph for the selected root cause "Bandwidth" 904 instead of "Communication" shown in FIG. 8. Note that information about the trace data collected is displayed in an area 902. This includes a tree structure showing a caller routine, a location in the source code (if debug information for the program is known), the MPI function called, the number of calls made, a bandwidth number, reflecting an effect that bandwidth had on total execution and a bandwidth percentage reflecting a percentage effect that bandwidth had on total execution.

FIG. 10 is an example screen shot showing a graph for the selected root cause "latency" 1004. Note that information about the trace data collected in displayed in an area 1002. This includes a tree structure showing a caller routine, a location in the source code (if debug information for the program is known), the MPI function called, the number of calls made, a latency number, reflecting an effect that latency had on total execution and a latency percentage reflecting a percentage effect that latency had on total execution.

The following paragraphs discuss how the graphs of FIGS. 6-12 are generated in a preferred embodiment.

The communication time analysis is performed as follows. The analysis program 110 reads the trace data and produces a histogram of when the user's program is spending time in an MPI library call or doing useful computation. The program preferably has a user-selected option to say how many "bins" should be used in the histogram which is typically a value like 700. The number of bins can be any value but is related to the width of the resulting graph to display in pixels. Its not useful to attempt to display more data than the resolution of the computer screen can show. Each histogram bin represents 1/(the number of bins) slice of time for the execution time of the program. The execution time preferably is the latest end time of all the processes in the job minus the earliest start time. For example, if the trace being analyzed took 100 seconds to execute and 100 bins are being used, then each bin would represent one second of execution time.

The last trace record is remembered for each process. The amount of time computing preferably is the current MPI call's start time minus the prior MPI call's end time (or the start time of the process if this is the first MPI call). The amount of time communicating is the duration of the MPI call. These two values are added to a running total for each process. The histogram bin values are computed by taking the duration of the MPI call and adding one times the fraction that the duration overlaps a bin to the total for that bin. For example, if an MPI call started at time 1.5 seconds and ended at time 2.1, bin zero would get zero added, bin one would get 1*0.5 added, and bin 2 would get 1*0.1 added. The "1" represents the process is communicating instead of computing (i.e., yes or no).

If all processes were performing an MPI call during a particular bin's time slice, the value for that bin would be N, the number of processes.

The bin computation is similar for the latency and bandwidth analyses except that instead of "1", the amount of time the MPI call is affected by latency or bandwidth is used.

In addition to the bin's value, a list of call sites is recorded per bin. The trace data records the stack trace addresses leading to that particular MPI call. The location of the user's binary program is known since that was recorded in the process header data in the trace file. If the user's program was compiled with debug information, the stack trace addresses and debug information can be used to compute the source code file name, line number and name of the function that made a call. A table of call sites is collected as each trace record is processed and each call site is given a unique identifier (a simple counter of when the call site record is added to the table). Typically, a given MPI library function may be called many times from the same location in a program and with the same stack trace. The call site identifier is recorded in the bin's list to save memory space.

FIG. 11(a) is a screen shot showing vertical bands, corresponding to a first selected portion of a trace that represents an amount of time the selected MPI call has on the execution time of the application. The tree represents the set of stack traces that call the MPI function (the tree root line is not visible in 1102). Here the user has selected a call to the routine hypre_SMGSolve from the file "smg_solve.c" line 164, which called hypre_SMGRelax from the file "smg_relax.c" line 325, etc. The selected trace occurs 1040 times.

The color of the line represents the effect that the MPI call had on the total execution time of the program. In the described embodiment, the color ranges from yellow to red, so an MPI call that had a 10% effect of the program would be 10% redder than a pure yellow line.

FIG. 11(b) is a screen shot showing vertical bands, corresponding to a second selected portion of a trace that represents an amount of time the selected MPI call has on the execution time of the application. Here, the user has selected a different call to the low level routine hypre_SMGSolve (it occurs in myapplication at line 279 instead of line 164) but which then called hypre_SMG_Relax from the file "smg_relax.c" line 325, etc similar to FIG. 11(a). This stack trace occurred 1664 times. Here, the color of the vertical bands indicates how much a particular MPI call had on the total execution time of the program.

FIG. 11(c) is a screen shot showing vertical bands, corresponding to a third selected portion of a trace that represents an amount of time the selected MPI call has on the execution time of the application. Here, the user has selected a different call to the low level routine hypre_SMGSolve (it occurs in myapplication at line 164) but which then called hypre_SMG_Relax from the file "smg_relax.c" line 325, etc similar to FIG. 11(a). This stack trace occurred 1040 times.

Here, the color of the vertical bands indicates how much a particular MPI call had on the total execution time of the program.

FIG. 11(d) is a screen shot showing vertical bands, corresponding to the first, second, and third selected portions of the trace, that are interposed on a graph of communication effect. Here, the user has selected a different call to a higher level routine hypre_SMGRelax to analyze and is analyzing an amount of communication that is occurring for all nodes in the system making this call. Note that this call includes all the calls graphed in FIGS. 11(a)-11(b). Here, the color of the vertical bands indicate how much a particular call is contributing to communication effect. The vertical bands shown are attributable to the selected caller hypre_SMGRelax that occurred at line 325 of the source code. It is called 6240 times.

FIG. 12 is a screen shot showing vertical bands, corresponding to a selected portion of a trace, that are interposed on a graph of communication effect.

The following paragraphs describe how the vertical bands are generated.

The histogram data is displayed as a standard Cartesian graph. As described above, the call site information preferably is displayed as a scrollable tree-structured list where each line is a summary of the stack traces lower down in the tree. Each line can be expanded to show the call stacks leading to that line in the program.

Each line at a given level in the tree is sorted by the overall effect it had on the program's execution. If you click on a line, you will see a vertical line for each stack trace. Each line keeps a list of the call stack identifiers used to compute the total effect for that line. This list is then used to find matching histogram buckets with the same call site identifier in the bucket's list. The buckets found determine the X and Y values for the vertical lines.

The color of the line is scaled from yellow to red proportional to the effect that the call site had on the program at the time represented by the bucket.

The first step for computing the latency or bandwidth effect is to group the MPI calls that are related. This grouping is determined by the MPI library specification for which calls are allowed to communicate to which others. Other specifications will use other appropriate groupings.

The analyzer takes the trace data from all the processes and sorts each record by its starting time so there is a single list of records to process. It then processes each record in order and uses the recorded input and output values to the MPI library call to determine the grouping.

In order to communicate between processes, MPI uses a "communicator" object and a "rank" (both are integers) to identify a particular sender, receiver, or group of processes. The communicator specifies the collection of processes and the rank specifies a particular process in the collection.

MPI_COMM_WORLD is a communicator defined by the specification to represent all the processes in the job. Several MPI functions provide for the creation of new communicator objects which form subsets of MPI_COMM_WORLD.

The MPI specification defines two broad classes of calls: collectives and point to point. The collective operations identified and used by the described embodiment are:

MPI_Barrier
MPI_Bcast
MPI_Reduce
MPI_Allreduce
MPI_Gather
MPI_Gatherv
MPI_Scatter
MPI_Scatterv MPI_Allgather
MPI_Allgatherv
MPI_Alltoall
MPI_Alltoallv
MPI_Reduce_scatter
MPI_Scan
MPI_Comm_create
MPI_Comm_dup
MPI_Comm_free
MPI_Comm_split Collective operations all take a communicator argument and communicates with all processes specified by the communicator. Thus, the rule for grouping is that all the processes specified by the communicator must execute the same MPI collective call. For example, if MPI_Bcast(MPI_COMM_WORLD) is seen in one process, there should be an MPI_Bcast(MPI_COMM_WORLD) trace record in all the other processes and those are grouped together for analysis.

The point to point MPI operations recognized and used in the described embodiment are:
MPI_Send
MPI_BSend
MPI_RSend
MPI_SSend
MPI_Sendrecv
MPI_Sendrecv_replace
MPI_Isend
MPI_Ibsend
MPI_Irsend
MPI_Issend
MPI_Recv
MPI_Irecv
MPI_Wait
MPI_Waitany
MPI_Waitall
MPI_Waitsome
MPI_Cancel The point to point operations have more complex grouping rules. The details are specified in the MPI specification for version 1.1, which is incorporated herein by reference, but briefly, a Send specifies a destination (communicator and rank) and a tag. A receive operation specifies a source (communicator and rank) and a tag. A send with tag T, to rank Rd, and communicator C, will match a receive with tag T, from rank Rs, and communicator C. Sends and receives can be asynchronous in which case, an asynchronous send must be followed by a wait and likewise an asynchronous receive must be followed by a wait. Synchronous sends can be matched with asynchronous receives and vice versa.

When a complete group is found, the latency and bandwidth effects can be calculated for that group. The calculation is MPI library implementation specific and also depends on the difference between the source and target values for network latency, code latency, and network bandwidth.

The described embodiment uses the measured latency (combined network and MPI library code latency) and bandwidth from the sanity checker program compared to an idealized network with zero latency and infinite bandwidth although the analyzer program allows other values to be used. The described embodiment has analyzer support for the MPICH library. For MPICH, we know that collective operations are based on point to point calls and uses log(N)/log(2) messages.

We record the stack trace for each call in the group. The latency effect is the latency delta times log(N)/log(2). The bandwidth effect is the number of bytes the collective needs to send times the delta time per byte times log(N)/log(2). Different analyses may be used in other embodiments of the invention.

For MPICH point to point calls, the latency effect is computed by looking at the number of bytes being sent. If its less than or equal to 1024, the start times for the send and receive are compared. This difference is called the offset. If the offset is less than or equal to zero (the receive started before the send), the latency effect is maximum (the latency delta between actual and target). If the offset is greater than the latency delta, the effect is zero (the receive was delayed long enough for the data to be ready at the receiver). Otherwise, the effect is the latency delta minus the offset time. If the number of bytes being sent is greater than 1024, the calculation is similar except that twice the latency delta is used since a set up message is sent as part of the MPI library implementation.

The bandwidth effect for point to point calls is the number of bytes being sent times the delta time per byte.

The latency and bandwidth effect number per call site is used to create a histogram the same way that the communication time histogram is calculated.

The figures depict embodiments of the present invention for purposes of illustration only. One skilled in the art will readily recognize from the following discussion that alternative embodiments of the structures and methods illustrated herein may be employed without departing from the principles of the invention described herein.

As will be understood by those familiar with the art, the invention may be embodied in other specific forms without departing from the spirit or essential characteristics thereof. Likewise, the particular naming and division of the modules, features, attributes, methodologies and other aspects are not mandatory or significant, and the mechanisms that implement the invention or its features may have different names, divisions and/or formats. Furthermore, as will be apparent to one of ordinary skill in the relevant art, the modules, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for displaying data for a clustered system having multiple nodes, comprising:
   (a) providing a user interface for running an experiment to analyze performance of an application program execution, the application program being executed by the multiple nodes of the clustered system, wherein each of the multiple nodes include a trace collector for collecting latency data, bandwidth data and communication data and each trace collector data is sent to a central trace collector for analysis;
   (b) selecting the experiment from among a plurality of options; the plurality of options providing a user an option to select from (i) an experiment that the user has previously run; (ii) start a new experiment; or (iii) select a template to run a series of experiments under different conditions;

(c) based on user selection, executing the application program at the multiple nodes in the clustered system; wherein portions of the application program are executed simultaneously by the multiple nodes;

(d) gathering trace data for the multiple nodes in the system, the trace data including data in accordance with communication between at least two nodes in the system;

(e) analyzing the gathered trace data to determine impact of latency, bandwidth and communication on a total effect of the selected experiment and to determine a duration that the application program spends in performing computing functions and a duration that the application program spends on an interface call used for passing messages between the multiple nodes executing portions of the application; and (f) displaying data for latency, bandwidth, and communication; wherein the displayed data for communication includes a communication number that shows a percentage effect that communication had on the total effect of the selected experiment.

2. The method of claim 1, wherein the displayed data includes vertical bands indicating how much the displayed data is contributing to a displayed effect.

3. The method of claim 1, wherein the displayed data for bandwidth includes a bandwidth number showing an effect that bandwidth had on application program execution.

4. The method of claim 1, wherein the displayed data for bandwidth includes a bandwidth percentage showing a percentage effect that bandwidth had on the application program execution.

5. The method of claim 1, wherein the displayed data for latency includes a latency number showing an effect that latency had on application program execution.

6. The method of claim 1, wherein the displayed data for latency includes a latency percentage showing a percentage effect that latency had on the application program execution.

7. The method of claim 1, wherein an analysis module reads the gathered trace data to determine a duration that the application program spends in performing computing functions and a duration that the application program spends in a messaging passing interface (MPI) call.

8. A method for displaying data for a clustered system having multiple nodes, comprising:

(a) selecting an experiment from among a plurality of options provided via a user interface;

wherein the experiment is for analyzing performance regarding an application program that is executed at multiple nodes of the clustered system; and the plurality of options provide a user an option to select from (i) an experiment that the user has previously run; (ii) start a new experiment; or (iii) select a template to run a series of experiments under different conditions; and wherein each of the multiple nodes include a trace collector for collecting latency data, bandwidth data and communication data and each trace collector data is sent to a central trace collector for analysis;

(b) based on user selection, executing an application program at the multiple nodes in the clustered system; wherein portions of the application program are executed simultaneously by the multiple nodes;

(c) gathering trace data for the multiple nodes in the system, the trace data including data in accordance with communication between at least two nodes in the system; and (d) analyzing the gathered trace data to determine impact of latency, bandwidth and communication on a total effect of the selected experiment and to determine a duration that the application program spends in performing computing functions and a duration that the application program spends on an interface call used for passing messages between the multiple nodes executing portions of the application;

(e) displaying data for one or more of: latency, bandwidth, and communication;

wherein the displayed data for communication displays a communication number that shows a percentage effect that communication had on application program execution; and wherein the displayed data for bandwidth includes a bandwidth number showing an effect that bandwidth had on application program execution.

9. The method of claim 8, wherein the displayed data for bandwidth includes a bandwidth percentage showing a percentage effect that bandwidth had on the application program execution.

10. The method of claim 8, wherein the displayed data includes vertical bands indicating how much the displayed data is contributing to the displayed effect.

11. The method of claim 8, wherein the displayed data for latency includes a latency number showing an effect that latency had on application program execution.

12. The method of claim 8, wherein the displayed data for latency includes a latency percentage showing a percentage effect that latency had on the application program execution.

13. The method of claim 8, wherein an analysis module reads the gathered trace data to determine a duration that the application program spends in performing computing functions and a duration that the application program spends in a messaging passing interface (MPI) call.

14. A system, comprising:

a plurality of network nodes in a clustered system; each node including a trace collector for collecting latency data, bandwidth data and communication data;

a central trace collector for receiving trace data from each trace collector of the plurality of nodes;

a graphical user interface provided to a user for selecting an experiment from among a plurality of options; wherein the experiment analyzes application program execution at the plurality of nodes; and the plurality of options provide a user an option to select from (i) an experiment that the user has previously run; (ii) start a new experiment; or (iii) select a template to run a series of experiments under different conditions; and based on user selection, executing the application program at the plurality nodes in the clustered system; wherein portions of the application program are executed simultaneously by the multiple nodes; gathering trace data for the plurality of nodes in the system, the trace data including data in accordance with communication between at least two nodes in the clustered system; analyzing the gathered trace data to determine impact of latency, bandwidth and communication on a total effect of the selected experiment and to determine a duration that the application program spends in performing computing functions and a duration that the application program spends on an interface call used for passing messages between the multiple nodes; and displaying data for latency, bandwidth, and communication;

wherein the displayed data for communication displays a communication number that shows a percentage effect that communication had on a total effect of the selected experiment; and wherein the displayed data for bandwidth includes a bandwidth number showing an effect that bandwidth had on application program execution.

15. The system of claim 14, wherein the displayed data for bandwidth includes a bandwidth percentage showing a percentage effect that bandwidth had on the application program execution.

16. The system of claim 14, wherein an analysis module reads the gathered trace data to determine a duration that the application program spends in performing computing functions and a duration that the application program spends in an messaging passing interface (MPI) call.

17. The system of claim 14, wherein the displayed data for latency includes a latency number showing an effect that latency had on application program execution.

18. The system of claim 14, wherein the displayed data for latency includes a latency percentage showing a percentage effect that latency had on the application program execution.

19. The system of claim 14, wherein the displayed data includes vertical bands indicating how much the displayed trace data is contributing to the displayed effect.

* * * * *

UNITED STATES PATENT AND TRADEMARK OFFICE
CERTIFICATE OF CORRECTION

| | | |
|---|---|---|
| PATENT NO. | : 7,555,549 B1 | Page 1 of 1 |
| APPLICATION NO. | : 10/983810 | |
| DATED | : June 30, 2009 | |
| INVENTOR(S) | : Ralph B. Campbell et al. | |

It is certified that error appears in the above-identified patent and that said Letters Patent is hereby corrected as shown below:

On the Title page, Item (57), "Abstract", line 4, delete "east" and insert -- easy --, therefor.

On page 2, in column 1, under "Other Publications", line 5, delete "Parellelism" and insert -- Parallelism --, therefor.

Signed and Sealed this

Twenty-sixth Day of October, 2010

David J. Kappos
*Director of the United States Patent and Trademark Office*